United States Patent
Bochum et al.

(10) Patent No.: US 6,662,776 B1
(45) Date of Patent: Dec. 16, 2003

(54) METHOD FOR OPERATING AN INTERNAL COMBUSTION ENGINE

(75) Inventors: Hansjoerg Bochum, Novi, MI (US); Dieter Buchholz, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,909

(22) PCT Filed: Apr. 13, 1999

(86) PCT No.: PCT/DE00/01146

§ 371 (c)(1), (2), (4) Date: Oct. 15, 2001

(87) PCT Pub. No.: WO00/61934

PCT Pub. Date: Oct. 19, 2000

(30) Foreign Application Priority Data

Apr. 13, 1999 (DE) .......................................... 199 16 525

(51) Int. Cl.⁷ ............................................... F02B 17/00
(52) U.S. Cl. ......................... 123/295; 123/305; 123/445
(58) Field of Search ................................ 123/294, 295, 123/305, 445, 486; 701/102, 103

(56) References Cited

U.S. PATENT DOCUMENTS

| | | | | |
|---|---|---|---|---|
| 5,778,857 A | * | 7/1998 | Nakamura et al. ..... | 123/406.37 |
| 5,881,694 A | * | 3/1999 | Nakada ...................... | 123/305 |
| 6,196,183 B1 | * | 3/2001 | Bauer et al. ................ | 123/295 |
| 6,209,526 B1 | * | 4/2001 | Sun et al. ................... | 123/481 |
| 6,234,140 B1 | * | 5/2001 | Mentgen et al. ........... | 123/295 |
| 6,240,895 B1 | * | 6/2001 | Oder ........................... | 123/295 |

FOREIGN PATENT DOCUMENTS

| | | |
|---|---|---|
| DE | 196 12 150 | 10/1997 |
| DE | 197 39 786 | 4/1998 |
| EP | 0 849 460 | 6/1998 |
| WO | WO 99 20882 | 4/1999 |

* cited by examiner

*Primary Examiner*—John Kwon
(74) *Attorney, Agent, or Firm*—Walter Ottesen

(57) ABSTRACT

An internal combustion engine (1), especially for a motor vehicle, is described. The engine has an injection valve (8) with which fuel can be injected directly into the combustion chamber (4) delimited by the piston (2) in a first operating mode during a compression phase and in a second operating mode during an induction phase. In addition, the engine (1) has a spark plug (9) with which the fuel, which is injected into the combustion chamber (4), can be ignited. A control apparatus (16) is provided, with which the injection valve (8) and the spark plug (9) are controllable. The injection of the fuel in each operating state of the engine (1) is ended by the control apparatus (16) in advance of the ignition of the fuel.

7 Claims, 2 Drawing Sheets

METHOD FOR OPERATING AN INTERNAL COMBUSTION ENGINE

FIELD OF THE INVENTION

The invention relates to a method for operating an internal combustion engine, especially of a motor vehicle, wherein fuel is injected directly into the combustion chamber in a first operating mode during a compression phase and in a second operating mode during an induction phase and wherein the fuel injected into the combustion chamber is ignited. The combustion chamber is delimited by a piston. Furthermore, the invention relates to an internal combustion engine, especially for a motor vehicle. The engine includes an injection valve with which fuel can be injected directly into a combustion chamber delimited by a piston in a first operating mode during a compression phase and in a second operating mode during an induction phase. The engine includes a spark plug with which the fuel injected into the combustion chamber can be ignited and includes a control apparatus with which the injection valve and the spark plug can be controlled.

BACKGROUND OF THE INVENTION

Systems of this kind for direct injection of fuel into the combustion chamber of an internal combustion engine are generally known. In this connection, a first operating mode, a so-called stratified operation, and a second operating mode, a so-called homogeneous operation, are distinguished. The stratified operation is especially used for smaller loads; whereas, the homogeneous operation is used for larger loads applied to the engine.

In stratified operation, the fuel is injected into the combustion chamber during the combustion phase of the engine and is injected there in the direct vicinity of the spark plug. This has the consequence that a uniform distribution of the fuel in the combustion chamber can no longer take place. The advantage of the stratified operation is that the smaller applied loads can be handled by the engine with a very low fuel mass. Larger loads can, however, not be satisfied by the stratified operation. In homogeneous operation, which is provided for such larger loads, fuel is injected during the induction phase of the engine so that a swirling and therefore a distribution of the fuel in the combustion chamber can easily take place. Thus, the homogeneous operation corresponds approximately to the operating mode of engines wherein fuel is injected into the intake manifold in the conventional manner.

In both operating modes, that is, in stratified operation and in homogeneous operation, the injection angle and the injection duration of the fuel to be injected are controlled (open loop and/or closed loop) to an optimal value by a control apparatus in dependence upon a plurality of parameters with respect to the following: fuel savings, toxic substance reduction and the like. This control (open loop and/or closed loop) ensures that, under normal operating conditions, the injection valve is closed when the injected fuel is ignited.

It is, however, possible that these normal conditions are no longer present, for example, because of a malfunction. Accordingly, it is possible that the high pressure pump is defective so that the fuel can be injected into the combustion chamber via the injection valve only by the rail pressure generated by the electric fuel pump.

In this case, the problem is present that the injection valve is still opened when the ignition of the fuel takes place. This would lead to damage of the injection valve.

SUMMARY OF THE INVENTION

It is an object of the invention to provide a method for operating an internal combustion engine with which a problem-free operation of the engine is possible.

This object or task is solved with the method of the kind initially mentioned herein or with an internal combustion engine of the kind initially mentioned herein in accordance with the invention in that the injection of the fuel is terminated in each operating state of the engine in advance of the ignition of the fuel.

In this way, it is ensured that the injection valve is closed in each case when the fuel is ignited by the spark plug. In this way, an early coking of the injection valve is reliably prevented. The operability and the service life of the injection valve is significantly increased thereby.

In an advantageous embodiment of the invention, the pressure is determined which is applied to the fuel to be injected. In this embodiment, the pressure present in the combustion chamber is determined and the injection of the fuel is ended in each operating state of the engine before or as soon as the pressure in the combustion chamber becomes greater than the pressure applied to the fuel.

The injection valve is closed at the latest at that time point in which the pressure in the combustion chamber becomes greater than the pressure applied to the fuel. In this way, it is achieved that no air/fuel mixture can be blown back from the combustion chamber into the injection valve. In this way, the operability of the fuel preparation system is maintained and a misfire or the like of the engine is avoided.

It is especially advantageous when the earlier one of the two cutoff angles is compared to the current rotational angle of the crankshaft and when an open injection valve is closed as soon as the current rotational angle of the crankshaft is equal to or greater than the selected earlier cutoff angle. In this way, it is ensured in each case that no injection valve is still open when the injected fuel is ignited in the combustion chamber or when the combustion chamber pressure is greater than the pressure operating on the fuel.

An advantageous configuration of the invention is characterized by the continuous repetition of the method of the invention at especially uniform time intervals or angular intervals. In this way, it is ensured that the method is carried out completely independently of all operating states of the engine so that, in each operating state of the engine, it is ensured that no damage to the injection valves takes place.

Of special significance is the realization of the method of the invention in the form of an electric control element which is provided for a control apparatus of an engine, especially of a motor vehicle. A program is stored on the electric control element which is capable of being run on a computer, especially on a microprocessor, and is suitable for executing the method according to the invention. In this case, the invention is realized by a program stored on the electric control element so that this control element, which is provided with the program, defines the invention in the same way as the method which the program can carry out.

Further features, application possibilities and advantages of the invention will become apparent from the following description of embodiments of the invention which are illustrated in the drawing. All described or illustrated features define the subject matter of the invention by themselves or in any desired combination independently of their summary in the patent claims or their dependency as well as independently of their formulation or presentation in the description and/or in the drawing.

BRIEF DESCRIPTION OF THE DRAWINGS

The invention will now described with respect to the drawings wherein.

DESCRIPTION OF THE PREFERRED EMBODIMENTS OF THE INVENTION

Figure 1:
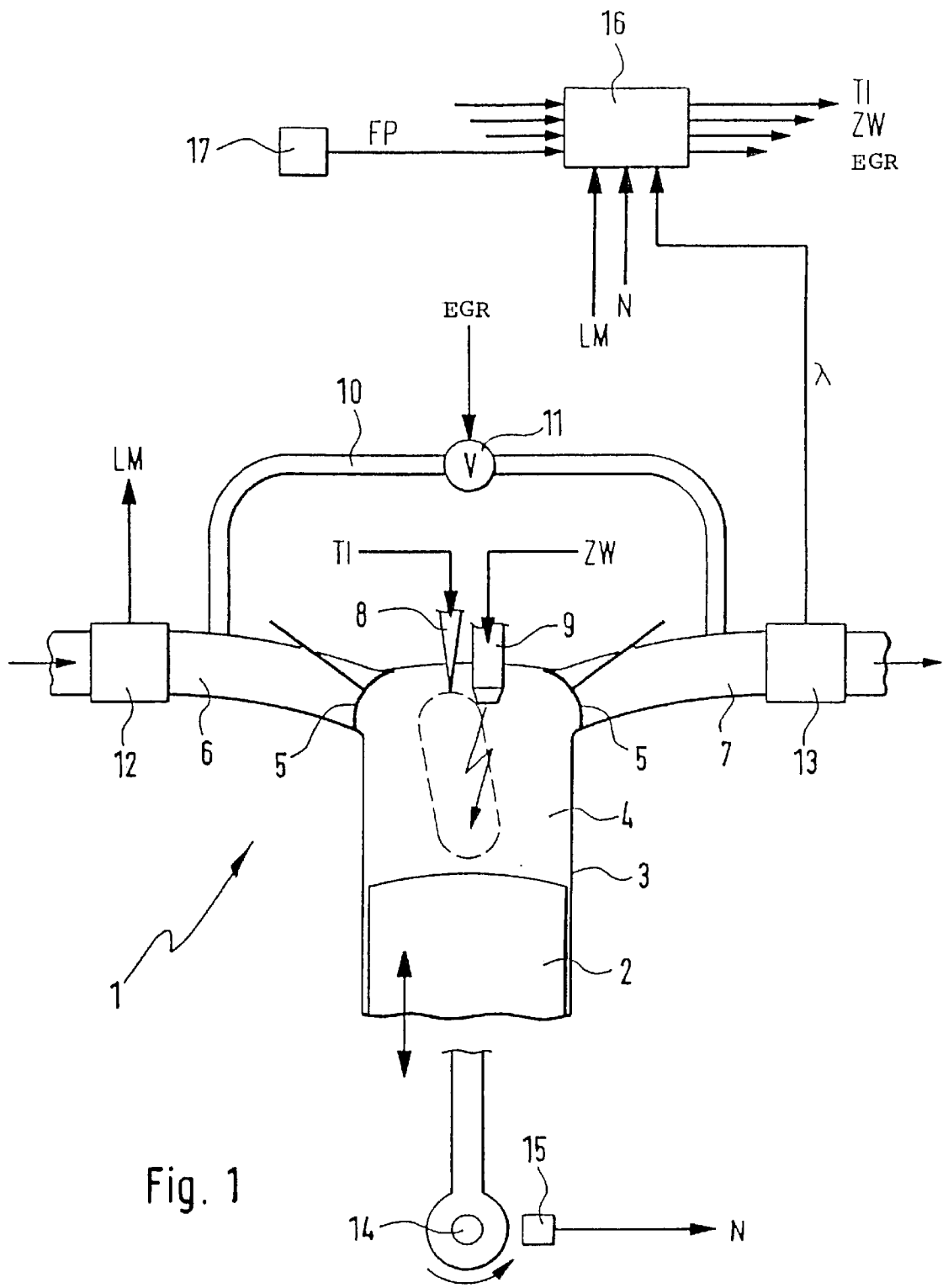
FIG. 1 is a schematic block circuit diagram of an embodiment of the internal combustion engine of a motor vehicle in accordance with the invention; and, FIG. 2 is a schematic block diagram of an embodiment of a method of the invention for operating the internal combustion engine of FIG. 1.

In FIG. 1, an internal combustion engine 1 is shown wherein a piston 2 is movable back and forth in a cylinder 3. The cylinder 3 is provided with a combustion chamber 4 to which an intake manifold 6 is connected via valves 5 and to which an exhaust-gas pipe 7 is connected. An injection valve 8, which is driven by a signal TI and a spark plug 9 which is controllable by a signal ZW are assigned to the combustion chamber 4. The exhaust-gas pipe 7 can be connected via an exhaust-gas recirculation line 10 and an exhaust-gas recirculation valve 11 to the intake manifold 6. The exhaust-gas recirculation valve 11 is controllable by a signal AGR.

The intake manifold 6 can be provided with an air mass sensor 12 and the exhaust-gas pipe 7 can be provided with a lambda sensor 13.

The air mass sensor 12 measures the oxygen mass of the fresh air supplied to the intake manifold 6 and generates a signal LM in dependence thereon. The lambda sensor 13 measures the oxygen content of the exhaust gas in the exhaust-gas pipe 7 and generates a signal λ in dependence thereon.

In a first operating mode, the stratified operation of the engine 1, the fuel is injected into the combustion chamber 4 by the injection valve 8 during a compression phase caused by the piston 2 and spatially into the direct vicinity of the spark plug 9 as well as, in time, directly in advance of top dead center of piston 2. The fuel is then ignited with the aid of the spark plug 9 so that the piston 2 is driven in the following work phase by the expansion of the ignited fuel.

In a second operating mode, the homogeneous operation of the engine 1, the fuel is injected into the combustion chamber 4 by the injection valve 8 during an induction phase caused by the piston 2. With the simultaneously inducted air, the injected fuel is swirled and is thereby distributed essentially uniformly in the combustion chamber 4. Thereafter, the air/fuel mixture is compressed during the compression phase in order to then be ignited by the spark plug 9. The piston 2 is driven by the expansion of the ignited fuel.

In the stratified operation as in homogeneous operation, a rotational movement is imparted to a crankshaft 14 by the driven piston and the wheels of the vehicle are then driven by the crankshaft. An rpm sensor 15 is assigned to the crankshaft 14 and generates a signal N in dependence upon the rotational movement of the crankshaft 14.

The fuel is injected into the combustion chamber 4 in stratified operation and in homogeneous operation under a high pressure via the injection valve 8. For this purpose, an electric fuel pump and a high pressure pump are provided. The high pressure pump can be driven by the engine 1 or can be driven electromotorically. The electric fuel pump generates a so-called rail pressure EKP of at least 3 bar and the high pressure pump generates a rail pressure HD of approximately 100 bar.

The fuel mass, which is injected into the combustion chamber 4 in stratified operation and in homogeneous operation by the injection valve 8, is controlled (open loop and/or closed loop) by a control apparatus 16 especially with respect to a low fuel consumption and/or a low development of toxic substances. For this purpose, the control apparatus 16 is provided with a. microprocessor which has a program stored in a storage medium, especially in a read-only-memory. The program is suitable to execute the above-mentioned control (open loop and/or closed loop).

Input signals are applied to the control apparatus 16 which define operating variables of the engine measured by sensors. For example, the control apparatus 16 is connected to the air mass sensor 12, to the lambda sensor 13, and to the rpm sensor 15. In addition, the control apparatus 16 is connected to an accelerator pedal sensor 17 which generates a signal FP which indicates the position of an accelerator pedal actuated by the driver. The control apparatus 16 generates output signals with which the performance of the engine can be influenced via actuators in correspondence to the desired control (open loop and/or closed loop). For example, the control apparatus 16 is connected to the injection valve 8, the spark plug 9 and the exhaust-gas recirculation valve 11 and generates the signals TI, DW and EGR required for their control.

The injection of the fuel, which is to be injected into the combustion chamber, is controlled by the signal TI. This injection is composed of an injection angle at which the injection begins and the injection duration which fixes the time-dependent length of the injection. In homogeneous operation, because of the required computation time, the injection angle and the injection duration are computed in each case by the control apparatus 16 in advance of the induction phase. The control apparatus 16 bases this computation on the operating state of the engine present at this time point, that is, in advance of the induction phase.

Under normal conditions, the injection angle and the injection duration are determined by the control apparatus 16 in such a manner that the injection valve 8 is already closed again before the injected fuel is ignited by the spark plug 9. Likewise, the injection angle and the injection duration are determined by the control apparatus 16 in such a manner that the injection valve 8 is likewise closed when the pressure in the combustion chamber 4 because of the compression by the piston 2 becomes greater than the pressure under which the fuel is injected into the combustion chamber 4 via the injection valve 8.

It is, however, possible that these normal conditions, for example, are no longer present because of a malfunction. Accordingly, it is possible that the high pressure pump is defective so that the fuel can only be injected into the combustion chamber via the injection valve 8 by the rail pressure EKP generated by the electric fuel pump. In this case, the control apparatus 16 would automatically lengthen the injection duration so that the problem is present that the injection valve 8 is still opened when the ignition of the fuel takes place. This would lead to damage of the injection valve 8.

Figure 2:
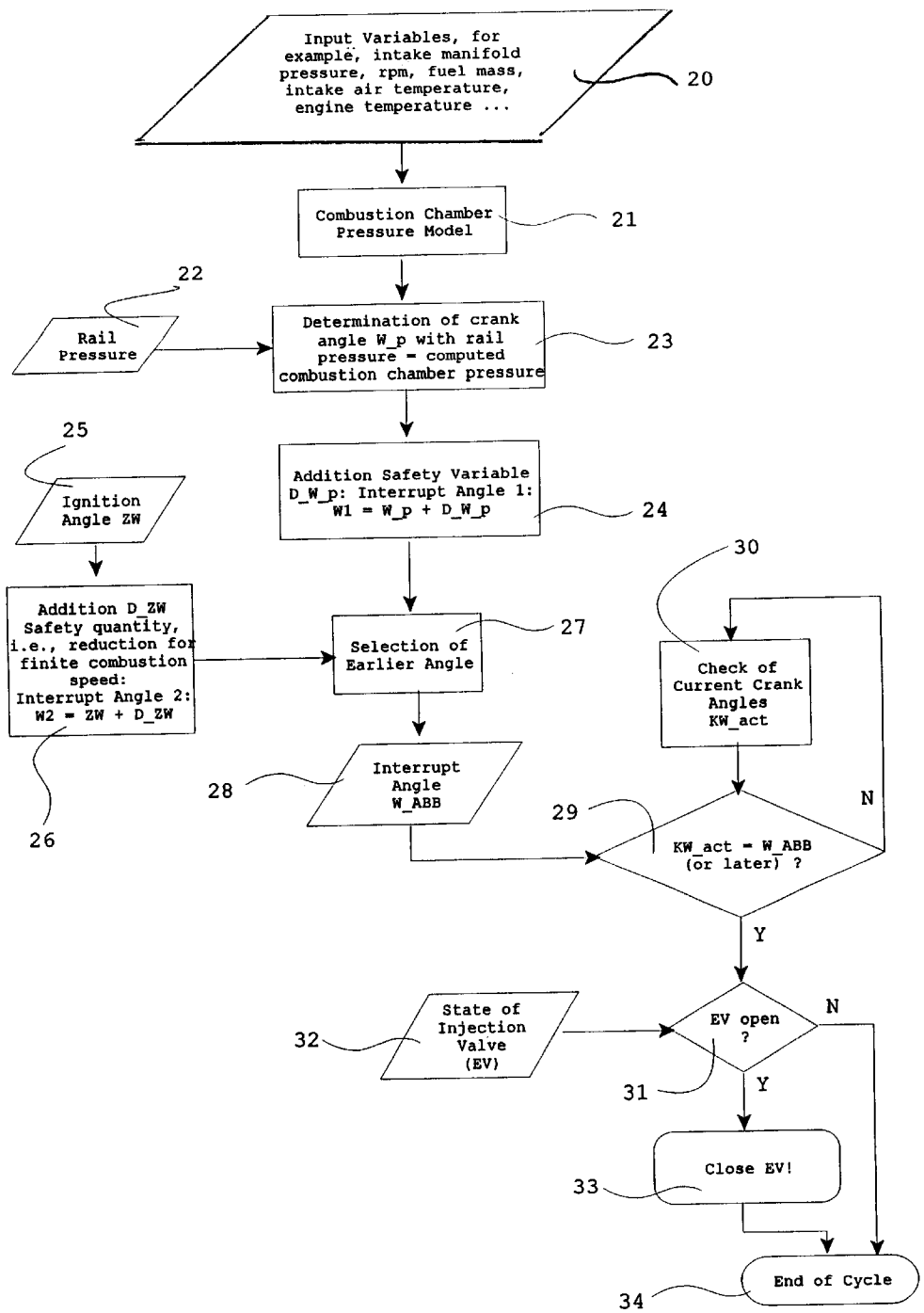

To reliably avoid such cases, the method, which is described in the following with respect to FIG. 2, is carried out by the control apparatus 16 in all operating states of the engine 1.

In dependence upon a plurality of input quantities 20, the pressure in the combustion chamber 4 of the engine 1 is determined by means of a combustion chamber pressure model 21 in dependence upon the rotational angle of the crankshaft 14. The input quantities 20 can be the following: the pressure in the intake manifold 6, the rpm N of the engine 1, the fuel mass to be injected, the temperature of the inducted air, the temperature of the engine 1 and/or other operating variables of the engine 1.

Alternatively or supplementally, it is possible to assign a sensor to the combustion chamber 4 with which the pressure in the combustion chamber 4 can be measured in dependence upon the rotational angle of the crankshaft 14.

With the aid of this sensor, that pressure is measured with which the fuel is injected into the combustion chamber 4 by the injection valves 8. For this purpose, a pressure sensor can be assigned, for example, to the pressure store, the so-called common rail via which the injection valves 8 of the engine 1 are connected to each other. As a result, the rail pressure 22 is then available.

In block 23 of FIG. 2, that rotational angle W_p of the crankshaft 14 is determined at which the combustion chamber pressure, which is determined by a combustion chamber model 21, is equal to the rail pressure 22. A safety spacing D_W_p is added to this rotational angle W_p so that a first interrupt angle results as follows:

$$W1 = W\_p + D\_W\_p$$

As explained, the ignition angle ZW is determined from other operating variables of the engine 1 by the control apparatus 16. This ignition angle ZW is assumed by block 25 in order to thereafter add a safety interval D_ZW in block 26. With this safety interval, the finite combustion speed of the ignited fuel can be considered. It can especially be considered that there is always a finite time duration still available because of the finite combustion speed until the flame front reaches the injection valve 8 and therefore can cause damage to the open injection valve 8. As a second interrupt angle, the following results:

$$W2 = ZW + D\_ZW$$

With block 27, that one of the two interrupt angles W1 and W2 is selected which lies earlier. This earlier angle is then transmitted by block 28 as interrupt angle W_ABB.

In block 29, a check is made as to whether the current rotational angle KW_act of the crankshaft 14 is equal to or later than the interrupt angle W_ABB. If this is not the case, then a new current rotational angle KW_act of the crankshaft 14 is read in by block 30 in order to thereafter repeat the comparison of block 29. This loop of blocks 29 and 30 is run through until, in block 29, the actual rotational angle KW_act is equal to or greater than the interrupt angle W_ABB. In this case, the method is continued with block 31.

In block 32, the state of the injection valve(s) 8 is inquired. This can take place by means of a sensor or with the aid of the control apparatus 16. This state is then transmitted by block 32 to block 31.

In block 31, the inquiry is made as to whether the injection valve(s) 8 are open. If this is the case, then the injection valve(s) 8 are immediately closed by block 33. Thereafter, the method is ended by block 34. If, in contrast, no injection valve 8 is open, then the method is ended immediately by block 34.

As mentioned, the above-described method is carried out in every operating state or in all operating states of the engine 1. The method is independent of the operating state of engine 1. This can, for example, be achieved in that the method is carried out at pregiven time intervals without considering the operating state of the engine 1. The method is therefore continuously repeated in all operating states. The time intervals between the individual run-through cycles are especially approximately equal. In lieu of the same time intervals, also the same angle intervals, for example, of the crankshaft 14 can be provided.

The described method with which the injection of fuel into the combustion chamber 4 is ended in advance of the ignition thereof can be advantageously switched in and out. In this way, computer time in the control apparatus 16 can be saved. Likewise, for a switched-off method, an injection of fuel can take place during the work phase of the engine 1 with which, for example, a catalytic converter can be heated.

What is claimed is:

1. A method for operating an internal combustion engine including an engine of a motor vehicle, wherein fuel is injected directly into a combustion chamber delimited by a piston in a first operating mode during a compression phase and in a second operating mode during an induction phase; and, wherein fuel injected into the combustion chamber is ignited; the method comprising the steps of:

determining a first interrupt angle (W1) dependent upon the pressure applied to the fuel to be injected and dependent upon the pressure in the combustion chamber;

determining a second interrupt angle (W2) for the injection, said second interrupt angle (W2) being dependent upon the ignition angle (ZW); and, comparing the earlier one of said first and second interrupt angles (W1, W2) to the current rotational angle (KW_act) of the crankshaft.

2. A method for operating an internal combustion engine including an engine of a motor vehicle, wherein fuel is injected directly into a combustion chamber delimited by a piston in a first operating mode during a compression phase and in a second operating mode during an induction phase; and, wherein fuel injected into the combustion chamber is ignited; the method comprising the steps of:

determining a first interrupt angle (W1) dependent upon the pressure applied to the fuel to be injected and dependent upon the pressure in the combustion chamber;

determining a second interrupt angle (W2) for the injection, said second interrupt angle (W2) being dependent upon the ignition angle (ZW);

comparing the earlier one of said first and second interrupt angles (W1, W2) to the current rotational angle (KW_act) of the crankshaft; and, wherein said first interrupt angle (W1) for the injection is composed of the rotational angle (W_p) of said crankshaft at which the pressure in the combustion chamber is equal to or greater than the pressure (rail pressure) applied to the fuel to be injected and a safety interval (D_W_p).

3. The method of claim 2, wherein said second interrupt angle (W2) for the injection is composed of the ignition angle (ZW) and a safety interval (D_ZW).

4. The method of claim 1, wherein an open injection valve is closed as soon as the actual rotational angle (KW_act) of the crankshaft is equal to or greater than the selected earlier interrupt angle (W_ABB).

5. The method of claim 1, wherein the method is continuously repeated especially at equal time intervals or angular intervals.

6. An electric control medium including a read-only-memory, for a control apparatus of an internal combustion engine including an engine of a motor vehicle, the electric control medium comprising a program stored thereon which is run on a computing apparatus including on a microprocessor, and the program being suitable for carrying out a method having the steps of:

determining a first interrupt angle (W1) dependent upon the pressure applied to the fuel to be injected and dependent upon the pressure in the combustion chamber;

determining a second interrupt angle (W2) for the injection, said second interrupt angle (W2) being dependent upon the ignition angle (ZW); and, comparing the earlier one of said first and second interrupt angles (W1, W2) to the current rotational angle (KW_act) of the crankshaft.

7. An internal combustion engine including an engine for a motor vehicle, the internal combustion engine comprising:

an injection valve with which fuel can be injected directly into a combustion chamber delimited by a piston in a first operating mode during a compression phase and in second operating mode during an induction phase;

a spark plug with which the fuel injected into the combustion chamber is ignited;

a control apparatus with which the injection valve and the spark plug are controlled; and, said control apparatus including: means for determining a first interrupt angle (W1) dependent upon the pressure applied to the fuel to be injected and dependent upon the pressure in the combustion chamber; means for determining a second interrupt angle (W2) for the injection, said second interrupt angle (W2) being dependent upon the ignition angle (ZW); and, means for comparing the earlier one of said first and second interrupt angles (W1, W2) to the current rotational angle (KW_act) of the crankshaft.

\* \* \* \* \*